Sept. 24, 1963  E. H. SCHWARTZ  3,104,748
CONVEYOR DOOR AND LOADING PLATFORM
Filed Oct. 27, 1961  2 Sheets-Sheet 1
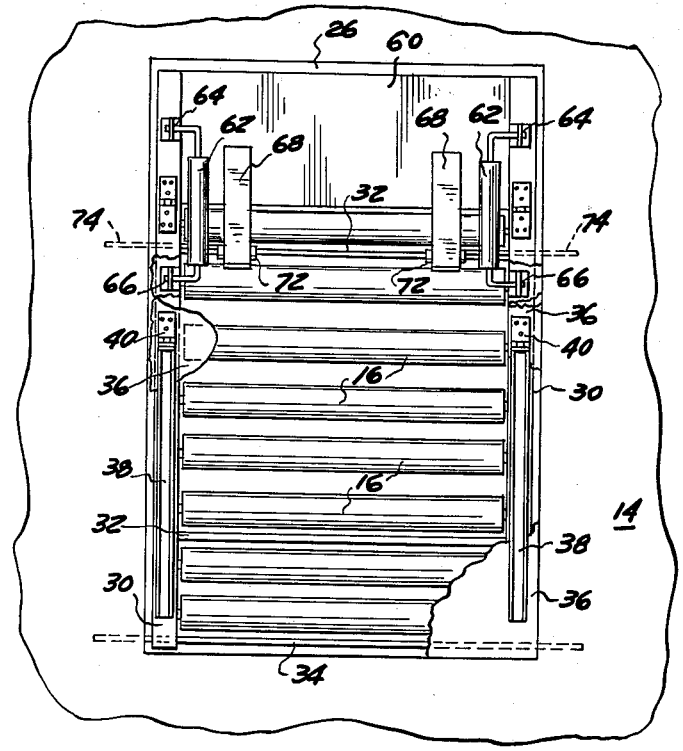
Fig. 1
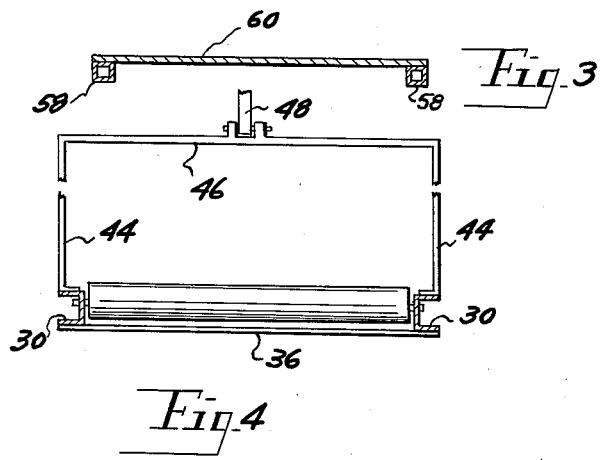
Fig. 3
Fig. 4
INVENTOR.
ERNEST H. SCHWARTZ
BY
Allen M. Krass
ATTORNEY Sept. 24, 1963  E. H. SCHWARTZ  3,104,748
CONVEYOR DOOR AND LOADING PLATFORM
Filed Oct. 27, 1961  2 Sheets-Sheet 2

INVENTOR.
ERNEST H. SCHWARTZ
BY Allen M Krass
ATTORNEY

United States Patent Office

3,104,748
Patented Sept. 24, 1963

3,104,748
CONVEYOR DOOR AND LOADING PLATFORM
Ernest H. Schwartz, 980 Whitmore, Detroit 3, Mich.
Filed Oct. 27, 1961, Ser. No. 148,243
8 Claims. (Cl. 193—33)

This invention relates to a door, which when opened forms an extension of a conveyor which projects adjacent to one of its sides and which door also forms a loading platform for the conveyor.

My invention particularly finds use in situations where a conveyor is disposed within a building so as to be useful in transporting articles and material toward and away from an opening in one of the building's walls. One end of the conveyor terminates immediately adjacent to the wall and the other end extends to a remote location within the building. In such remote locations, it is often at a depressed level with respect to the wall opening so that a gravity conveyor may be employed, although the present invention is also useful in connection with powered conveyors which may transport articles to an elevated location. The present invention particularly contemplates a door for such wall opening which hinges about a horizontal axis so that it seals the wall opening when in a vertical position. The door has conveyor elements, such as rollers, disposed about its inner surface so that when the door is opened to a position wherein it is inclined with respect to the vertical axis, it forms an extension of the conveyor beyond the wall of the building to a height readily accessible from trucks.

At its end, which is disposed away from the building when the door is at an opened position, there is carried a platform which is hinged to the door about a horizontal axis. When the door is closed, mechanism is provided for extending the platform parallel to the door so that it acts as an extension thereof and is operative to close off the wall opening or is at least recessed therewithin so as to be unobtrusive with respect to the wall. When the door is opened so as to form an extension of the conveyor, the mechanism is operative to rotate the platform about its line of juncture with the door so as to cause it to extend in the horizontal plane and thus, normally extend at an angle with respect to the door which is inclined with respect to the horizontal. The platform may also have conveyor elements along a section of its upper surface.

It is a principal object of the present invention to provide a door for a wall opening which hinges about a horizontal axis to an inclined position so as to form an extension of an adjacent conveyor when opened. Another object is to provide such a door which carries a platform at its outer end and includes means for extending the platform horizontally to the door when the door is in a closed position and for rotating the platform to a horizontal position when the door is opened and forms an extension of the conveyor.

The use of such a door extending to a convenient loading height makes it possible to convey articles and material down the building conveyor without the necessity of first manually unloading such articles to ground level or alternatively providing a separate conveyor section which must be removed from and returned to the building area each time the conveyor is put in use.

Other objects, advantages, and applications of the present invention will be made apparent by the following detailed description of a preferred embodiment of the invention. The description makes reference to the accompanying drawings in which:

FIGURE 1 is an elevation view, from the outside, of a wall opening containing the door of the present invention in a closed position;

FIGURE 3 is a sectional view through the loading platform taken along lines 3—3 of FIGURE 2, and FIGURE 4 is a cross-section through the conveyor taken along lines 4—4 of FIGURE 2.

Figure 2:
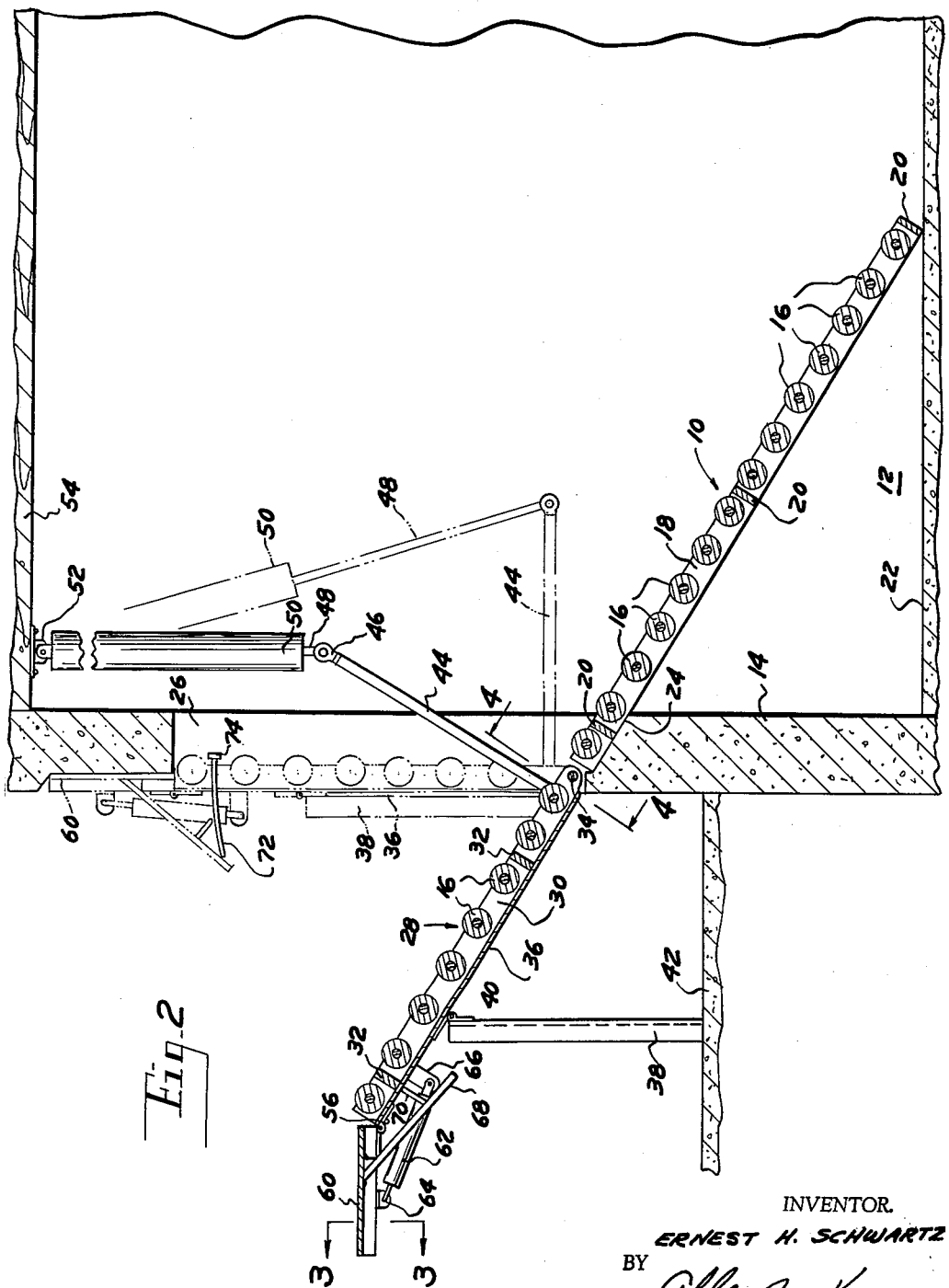
FIGURE 2 is an elevation sectional view through the wall and the conveyor-door in an opened position with the closed position of the door shown in phantom lines.

The invention is illustrated in connection with a roller conveyor, generally indicated at 10, which communicates between the basement area 12 of a building and an outer wall 14 of the building. The conveyor 10 is formed of a plurality of roller elements 16 which have their axes in horizontal planes and are journaled in bearings supported in two end channel sections 18. Steel reinforcing plates 20 extend transversely between the channel sections 18 at regular intervals in order to separate the channels and stiffen the structure. The lower end of the conveyor rests on the floor 22 of the basement area 12 while the upper end of the conveyor rests in an inclined section 24 formed on the lower edge of a rectangular wall opening 26. The rollers 16 extend beyond the upper line of the channel sections 18 so that articles may be rolled down the conveyor in the normal manner.

The door, generally indicated at 28, is also formed about a pair of parallel channel sections 30 joined by transverse steel bars 32. Both channel sections 30 are hinged at their lower edge about a pin 34 which has its ends retained within the wall 14 on opposite sides of the lower edge of the opening 26.

The outer edge of the door 28 is covered by a plate 36 which is welded to the channels 30 and the cross members 32 and acts as the cover for the wall opening when the door is in a closed position. This cover 36 is shown broken away in FIGURE 1 to disclose the other elements.

A pair of legs 38 have their upper ends joined by hinges 40 to opposite sides of the plate 36 adjacent its upper edge. As may be seen in FIGURE 2 when the door is in an opened position, these legs 38 depend downwardly and abut the ground level surfacing 42 in order to support the door at an inclined angle which makes it an extension of the roller conveyor 10. When the door is closed, as illustrated in FIGURE 1 and in phantom in FIGURE 2, the legs 38 fall into a vertical position against the door cover plate 36.

A pair of arms 44 are fixed to the upper edges of the channel sections 30 which form the sides of the door 28 immediately adjacent the hinge point 34. These arms 44 extend perpendicularly to the plane of the door and are joined at their extreme ends by the cross member 46 which lies in the plane of the door. The extreme end of a rod 48 of a fluid cylinder 50 is trunnion mounted to the center of the cross arm 46. The cylinder is similarly trunnion mounted to a bracket 52 which is supported on the ceiling 54 of the building interior to the wall 14.

The action of the cylinder 50 in opening and closing the door 28 is best illustrated in FIGURE 2. When the rod 48 of the cylinder 50 is retracted, the cross member 46 rises and allows the door 28 to pivot about its hinge point 34 until the legs 38 contact the surface 42. As the cylinder 50 extends its rod 48 under suitable fluid flow from the control system (not shown), the bars 44 are pivoted into a horizontal position causing the conveyor 28 to be raised until it is in a vertical position completely shutting off the opening 26.

Another hinge 56 which is attached to the outward end of the plate 36 and extends transversely to the channel members 30 carries another pair of channel members 58 which extend parallel to one another and support a loading platform 60 on their upper surface. A pair of pneumatic cylinders 62 are disposed adjacent to either edge of the assembly and have their rod ends pivotably attached to plate 64 on the opposed edges of the platform 60 while their cylinder ends are pivotably mounted in plates 66 attached to opposed sides of the door plate 36 adjacent to its outward end. The cylinders 62 are not powered but are rather adapted to damp the motion of the platform 60 about its hinge 56.

A pair of arms 68 connected to the lower side of the platform 60 on opposed sides extend downwardly therefrom. When the door 28 is raised into a closed position a pair of arms 72, which are connected to a cross member 74 that is fixed in the edges of the wall 14, strike the arms 68 and cause the platform 60 to be pivoted upwardly about its hinge point 56 so that it forms a linear extension of the door 28. When the door 28 is lowered, the force of gravity causes the platform 60 to rotate in a counterclockwise direction as viewed in FIGURE 2 about its hinge plate 56. This motion is terminated when a pair of arms 70 which extend from near the outer edges of the arms 68 strike a frame cross member 32 to prevent a further rotation of the platform.

When the arm 70 strikes the cross members 32, the platform 60 is at such an angle with respect to the door 28 that when the motion of the door ceases at a position shown in FIGURE 2, the platform 60 is in a horizontal position. The rollers 16 and the door 28 are placed at such a position that articles may be pushed off of the platform 60 directly onto the roller conveyor. The platform 60 is preferably at such a height as will allow loading from trucks.

In summary, action of the cylinder 50 in extending its rod 48 causes the door 28 to be rotated about the hinge point 34 from the open position shown in FIGURE 2 to the closed, phantom, position shown in the same drawing. As this motion occurs, the legs 38 rotate about their hinges 40 to a position in which they lie flat against the door when it is in a vertical position. When the rods 72 contact the arms 68, they cause the platform 60 to be rotated about its hinge 56 so as to form an extension of the plane of the door when the door is in a vertical position.

Having thus described my invention, I claim:

1. A device for use in connection with a wall having an aperture therein and a conveyor having one termination on a first side of said wall comprising: a planar door member having a shape substantially that of said aperture and being hinged about a horizontal line on the lower edge of said aperture so as to be disposable in a first, closed, position wherein it is in a vertical position and closes off said aperture, or a second, open, position, wherein it is inclined with respect to the vertical; a platform hinged to the end of said door opposite to that which is hinged to said wall so as to create a horizontal axis of rotation for the platform; and means for retaining said platform as a linear extension of said door when the door is in its closed position, and for supporting said platform in a horizontal position when said door is in an opened position.

2. A device for use in connection with a wall having an aperture therein and a conveyor having one termination adjacent a first side of said wall comprising: a planar door member having a shape substantially that of said aperture and being hinged about a horizontal line on the lower edge of said aperture so as to be disposable in a first, closed, position wherein it is in a vertical position and closes off said aperture, or a second, open, position, wherein it is inclined with respect to the vertical; a plurality of conveyor elements attached to that surface of the door which forms the upper surface when it is in an opened position; a platform hinged to the end of said door opposite to that which is hinged to said wall so as to create a horizontal axis of rotation for the platform; and means for supporting said platform as a linear extension of said door when the door is in its closed position, and for supporting said platform in a horizontal position when said door is in an opened position.

3. A door for use with a wall having an aperture therein and a descending conveyor having its upper end disposed adjacent to the lower edge of said aperture comprising: a planar member having its lower edge hinged about a horizontal axis parallel to the plane of the wall and adjacent to the upper end of said conveyor; mechanism having one end attached to said door and the other end fixed with respect to said structure so as to be capable of disposing said door in two positions, a first, closed, position wherein said door is in a vertical position so as to susbtantially close said aperture and a second, open, position wherein said door is inclined with respect to the vertical so as to form a linear extension of said conveyor; a platform hinged about a horizontal axis fixed to the upper edge of said door; and stop means operative to allow said platform to fall under the influence of gravity into a horizontal position when said door is in an opened position, and operative to restore said platform to a vertical position, wherein it forms an extension of the plane of said door, when said door is moved to a closed position.

4. A door for use with a wall having an aperture therein and a descending conveyor having its upper end disposed adjacent to the lower edge of said aperture comprising: a planar member having its lower edge hinged about a horizontal axis parallel to the plane of the wall and adjacent to the upper end of said conveyor; mechanism having one end attached to said door and the other end fixed with respect to said structure so as to be capable of disposing said door in two positions, a first, closed, position wherein said door is in a vertical position so as to substantially close said aperture and a second, open, position wherein said door is inclined with respect to the vertical so as to form a linear extension of said conveyor; conveyor elements attached to the surface of said door which is uppermost when said door is in an opened position; a platform hinged about a horizontal axis fixed to the upper edge of said door; and stop means operative to allow said platform to fall under the influence of gravity into a horizontal position when said door is in an opened position, and operative to restore said platform to a vertical position, wherein it forms an extension of the plane of said door, when said door is moved to a closed position.

5. A device for use in connection with a wall having an aperture therein and a conveyor having one termination on a first side of said wall comprising: a planar door member having a shape substantially that of said aperture and being hinged about a horizontal line on the lower edge of said aperture so as to be disposable in a first, closed, position wherein it is in a vertical position and closes off said aperture, or a second open, position, wherein it is inclined with respect to the vertical; a fluid cylinder fixed with respect to said wall, disposed above and connected to said door member, and adapted, when actuated, to move said door between said two positions; a platform hinged to the end of said door opposite to that which is hinged to said wall so as to create a horizontal axis of rotation for the platform; and means for retaining said platform as a linear extension of said door when the door is in its closed position, and for supporting said platform in a horizontal position when said door is in an opened position.

6. A device for use in connection with a wall having an aperture therein and a conveyor having one termination on a first side of said wall comprising: a planar door member having a shape substantially that of said aperture and being hinged about a horizontal line on the lower edge of said aperture so as to be disposable in a first, closed, position wherein it is in a vertical position and closes off said aperture, or a second, open, position, wherein it is inclined with respect to the vertical; a fluid cylinder fixed with respect to said wall, disposed above said door member; a rod actuated by said cyilnder; a pair of arm members connecting said rod to opposing extending edges of said door member; a platform hinged to the end of said door opposite to that which is hinged to said wall so as to create a horizontal axis of rotation for the platform; and means for retaining said platform as a linear extension of said door when the door is in its closed position, and for supporting said platform in a horizontal position when said door is in an opened position.

7. A door for use with a wall having an aperture therein and a descending conveyor having its upper end disposed adjacent to the lower edge of said aperture comprising: a planar member having its lower edge hinged about a horizontal axis parallel to the plane of the wall and adjacent to the upper end of said conveyor; mechanism having one end attached to said door and the other end fixed with respect to said structure so as to be capable of disposing said door in two positions, a first, closed, position wherein said door is in a vertical position so as to substantally close said aperture and a second, open, position wherein said door is inclined with respect to the vertical so as to form a linear extension of said conveyor; conveyor elements attached to the surface of said door which is uppermost when said door is in an opened position; a platform hinged about a horizontal axis fixed to the upper edge of said door; stop means operative to allow said platform to fall under the influence of gravity into a horizontal position when said door is in an opened position, first projecting arm means connected to said platform; and second projecting arm means connected to said wall and operative to strike said first arm means so as to move said platform to a vertical position, wherein it forms an extension of the plane of said door, when said door is moved to a closed position.

8. A door for use with a wall having an aperture therein and a descending conveyor having its upper end disposed adjacent to the lower edge of said aperture comprising: a planar member having its lower edge hinged about a horizontal axis parallel to the plane of the wall and adjacent to the upper end of said conveyor; mechanism having one end attached to said door and the other end fixed with respect to said structure so as to be capable of disposing said door in two positions, a first, closed, position wherein said door is in a vertical position so as to substantally close said aperture and a second, open, position wherein said door is inclined with respect to the vertical so as to form a linear extension of said conveyor; conveyor elements attached to the surface of said door which is uppermost when said door is in an opened position; a platform hinged about a horizontal axis fixed to the upper edge of said door; pneumatic cylinder damping means operative to allow said platform to fall under the influence of gravity into a horizontal position when said door is in an opened position; first projecting arm means connected to said platform; and second projecting arm means connected to said wall and operative to strike said first arm means so as to move said platform to a vertical position, wherein it forms an extension of the plane of said door, when said door is moved to a closed position.

References Cited in the file of this patent

UNITED STATES PATENTS 2,904,196      Teixeira _____ Sept. 15, 1959